US006293726B1

(12) United States Patent
Wolf

(10) Patent No.: US 6,293,726 B1
(45) Date of Patent: Sep. 25, 2001

(54) HANDLE ATTACHMENT DEVICE FOR CLEANING IMPLEMENTS

(76) Inventor: B. Andrew Wolf, 17 Topping La., St. Louis, MO (US) 63131

( * ) Notice: Subject to any disclaimer, the term of this patent is extended or adjusted under 35 U.S.C. 154(b) by 0 days.

(21) Appl. No.: 09/410,221

(22) Filed: Sep. 30, 1999

(51) Int. Cl.[7] ................................ B25G 3/00; F16B 3/00

(52) U.S. Cl. .......................... 403/299; 411/178; 403/305; 403/296

(58) Field of Search .................................... 403/299, 292, 403/296, 300, 305, 307; 411/178

(56) References Cited

U.S. PATENT DOCUMENTS

| | | | | |
|---|---|---|---|---|
| 155,469 | | 9/1874 | Seymour | 15/148 |
| 628,958 | * | 7/1899 | Pape | 24/708.5 |
| 1,752,512 | | 4/1930 | Smith | 15/148 |
| 2,299,810 | | 10/1942 | Fatland | 15/148 |
| 2,702,917 | | 3/1955 | Lynden | 15/230.11 |
| 2,705,336 | | 4/1955 | Wilson | 15/145 |
| 4,117,643 | * | 10/1978 | Lamothe | 52/699 |
| 4,285,096 | * | 8/1981 | Swaim | 16/114 R |
| 4,334,334 | * | 6/1982 | Wendell | 15/236 R |
| 5,305,573 | * | 4/1994 | Baumann | 52/726.1 |
| 5,334,101 | * | 8/1994 | McDermott | 473/44 |
| 5,366,314 | * | 11/1994 | Young | 403/299 |
| 5,385,420 | * | 1/1995 | Newman, Sr. et al. | 403/299 |
| 5,752,287 | | 5/1998 | Wheat | 15/176.2 |
| 5,788,440 | * | 8/1998 | Andronica | 411/178 |
| 5,842,810 | * | 12/1998 | Morad | 403/301 |

* cited by examiner

*Primary Examiner*—Lynne H. Browne
*Assistant Examiner*—John B. Walsh
(74) *Attorney, Agent, or Firm*—Senniger, Powers, Leavitt & Roedel

(57) ABSTRACT

A device for attaching an elongated handle to any one of a variety of cleaning implements, regardless of whether the cleaning implements are provided with a socket or a protuberance for purposes of attaching an elongated handle thereto. The device preferably comprises an externally threaded protuberance and an internally threaded socket, where the threads of the externally threaded protuberance and the internally threaded socket are non-complementary to one another, the externally threaded protuberance is adapted for mating with a socket having complementary internal threads, and the internally threaded socket is adapted for mating with a protuberance having complementary external threads, whereby the device can be joined with another device comprising either one of the socket having complementary internal threads and the protuberance having complementary external threads. The externally threaded protuberance and the internally threaded socket of the device are preferably coaxial, and the internally threaded socket is preferably positioned within and surrounded by the threads of the externally threaded protuberance. The device may also comprise a socket for attaching an elongated handle to the device, or the device may comprise an integrally formed handle. Preferable, the device has a monolithic construction, and is formed from either plastic or metal.

9 Claims, 3 Drawing Sheets

HANDLE ATTACHMENT DEVICE FOR CLEANING IMPLEMENTS

The present invention relates primarily to a device for attaching an elongated handle to a cleaning implement and, more particularly, to a device having both an externally threaded protuberance and an internally threaded socket for attaching an elongated handle to a cleaning implement provided with either one of a complementary internally threaded socket and a complementary externally threaded protuberance.

BACKGROUND OF THE INVENTION

A variety of cleaning implements are known in the art, including various types of brooms, mops, scrapers, squeegees, etc. In most cases, these cleaning implements are provided with some type of means for attaching an elongated handle thereto. For example, and as shown in FIG. 1, a broom head A is shown provided with an internally threaded socket B that is used for attaching an elongated handle C to the broom head. As shown in FIG. 1, one end of the elongated handle C is provided with an externally threaded protuberance D that is complementary to the internally threaded socket B of the broom head A. Thus, the elongated handle C can be attached to the broom head A by engaging its threaded protuberance D with the threaded socket B of the broom head.

Another means for attaching an elongated handle to a cleaning implement is shown in FIG. 2. In this example, a mop head E is shown provided with an externally threaded stem or protuberance F for attaching the mop head to an elongated handle G. As shown in FIG. 2, one end of the elongated handle G is provided with an internally threaded socket H that is complementary to the externally threaded protuberance F of the mop head E. Thus, the elongated handle G can be attached to the mop head E by engaging its threaded socket H with the threaded protuberance F of the mop head.

The elongated handles shown in FIGS. 1 and 2 are frequently sold separately from the cleaning implements with which they are used. Thus, an individual purchasing, for example, the broom and mop heads shown in FIGS. 1 and 2 must also purchase at least two handles for use therewith, namely, an elongated handle of the type shown in FIG. 1 (for use with the broom head A) and an elongated handle of the type shown in FIG. 2 (for use with the mop head E).

Even where a cleaning implement is sold together with an elongated handle, the handles may also be sold separately as replacement parts. For example, if the handle C shown in FIG. 1 breaks or somehow becomes incapable of engaging the threaded socket B of the broom head A, the handle C must be replaced with a like handle. Similarly, if the handle G shown in FIG. 2 breaks or somehow becomes incapable of engaging the threaded protuberance F of the mop head E, the handle G must be replaced with a like handle. Furthermore, if a party desires to stock replacement parts for a cleaning implement having the handle attachment means B shown in FIG. 1 as well as for a cleaning implement having the handle attachment means F shown in FIG. 2, the party must inventory both types of elongated handles C, G, since the elongated handle C is not designed to engage a cleaning implement provided with an externally threaded protuberance (e.g., the mop head E shown in FIG. 2), and the elongated handle G is not designed to engage a cleaning implement provided with an internally threaded socket (e.g., the broom bead A shown in FIG. 1).

As recognized by the inventor hereof, what is needed is a device capable of attaching an elongated handle to a cleaning implement provided with an internally threaded socket, and also capable of attaching the same elongated handle to a cleaning implement provided with an externally threaded protuberance.

SUMMARY OF THE INVENTION

In order to solve these and other needs in the art, the inventor hereof has succeeded at designing and developing a device capable of attaching a single elongated handle to any one of a variety of cleaning implements, regardless of whether the cleaning implements are provided with a socket or a protuberance for purposes of attaching an elongated handle thereto. A direct result of this inventive device is a reduction in parts and inventory costs for the user, and an increase in versatility and worker productivity. For example, where an individual intends to purchase both the broom head A shown in FIG. 1 and the mop head E shown in FIG. 2, only one elongated handle needs to be purchased, thus reducing initial equipment costs. Using the device of the present invention, the same elongated handle can be coupled, for example, first to the broom head A, and then to the mop head E, for performing a particular cleaning operation. Further, if the individual desires to stock replacement parts, only a single elongated handle and the preferred device of the present invention are required to ensure that a replacement handle is readily available for a variety of cleaning implements. Moreover, where replacement parts, per se, are not available to an individual in a time of need, the device of the present invention can be used to readily attach virtually any available handle to a cleaning implement, thereby reducing worker down time and thus increasing worker productivity. For example, if it became necessary to provide the mop head E shown in FIG. 2 with a new elongated handle, the elongated handle C could be removed from the broom head A shown in FIG. 1 and attached to the mop head E shown in FIG. 2 using the device of the present invention, as will be apparent from the description which follows.

In accordance with one aspect of the present invention, a device comprises an externally threaded protuberance and an internally threaded socket, where the threads of the externally threaded protuberance and the internally threaded socket are non-complementary to one another, the externally threaded protuberance is adapted for mating with a socket having complementary internal threads, and the internally threaded socket is adapted for mating with a protuberance having complementary external threads, whereby the device can be joined with another device comprising either one of the socket having complementary internal threads and the protuberance having complementary external threads. The externally threaded protuberance and the internally threaded socket of the device are preferably coaxial, and the internally threaded socket is preferably positioned within and surrounded by the threads of the externally threaded protuberance. The device may also comprise a socket for attaching an elongated handle to the device, or the device may comprise an integrally formed handle. Preferably, the device has a monolithic construction, and is formed from either plastic or metal.

In accordance with another aspect of the present invention, a device for coupling an elongated handle to a cleaning implement includes a protuberance insertable into a complementary socket of a cleaning implement, and a socket adapted for receiving a complementary protuberance of a cleaning implement, where the protuberance and the socket of the device are non-complementary to one another, and the device is attachable to a cleaning implement having either one of the complementary socket and the complementary protuberance. Preferably, the protuberance of the device includes external threads for mating with a complementary internally threaded socket of a cleaning implement, and the socket of the device includes internal threads for mating with a complementary externally threaded protuberance of a cleaning implement. The socket of the device is preferably positioned between and surrounded by the threads of the device's protuberance, and is preferably coaxial with said protuberance. The device may also comprise a socket for attaching an elongated handle to the device.

In accordance with still another aspect of the present invention, a method of using a device having both an externally threaded protuberance and an internally threaded socket, where the threads of the protuberance and the socket are non-complementary to one another, comprises one of the steps of mating the externally threaded protuberance of the device with a complementary internally threaded socket of a cleaning implement, and mating the internally threaded socket of the device with a complementary externally threaded protuberance of a cleaning implement, thereby joining the device with one of said cleaning implements. The method may also comprise the step of attaching the device to an elongated handle. The cleaning implement joined to the device by way of this method may be a broom head, a mop head, or any other type of cleaning implement.

While some of the principal features and advantages of the invention have been mentioned above, a greater and more thorough understanding of the present invention may be attained by referring to the drawings and the detailed description of the preferred embodiments provided below.

DETAILED DESCRIPTION OF THE PREFERRED EMBODIMENTS

Figure 3:
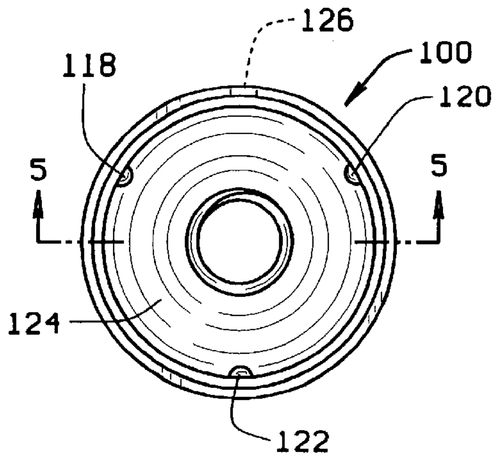
FIG. 3 is a top view of a handle attachment device according to one embodiment of the present invention.
Figure 6:
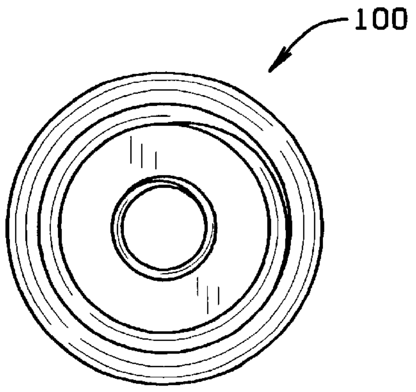
FIG. 6 is a bottom view of the handle attachment device shown in FIGS. 3 and 4.
Figure 4:
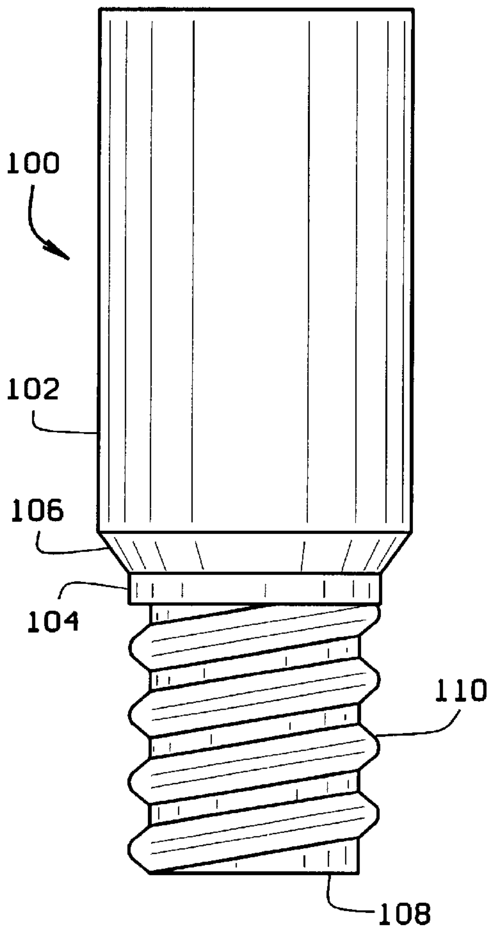
FIG. 4 is a front view of the handle attachment device shown in FIG. 3.

A handle attachment device according to one preferred embodiment of the present invention is shown in FIGS. 3–6 and is referred to generally by reference character 100. As shown in FIG. 4, the attachment device 100 includes a cylindrical main wall 102 that is connected to a cylindrical collar 104 by way of a tapered section 106. Projecting downwardly (in FIG. 4) from the cylindrical collar 104 is a protuberance 108, which is preferably provided with external threads 110. The protuberance 108 and the threads 10 are preferably dimensioned to mate with an internally threaded socket of a cleaning implement, such as the internally threaded socket B of the broom head A shown in FIG. 1.

Figure 2:
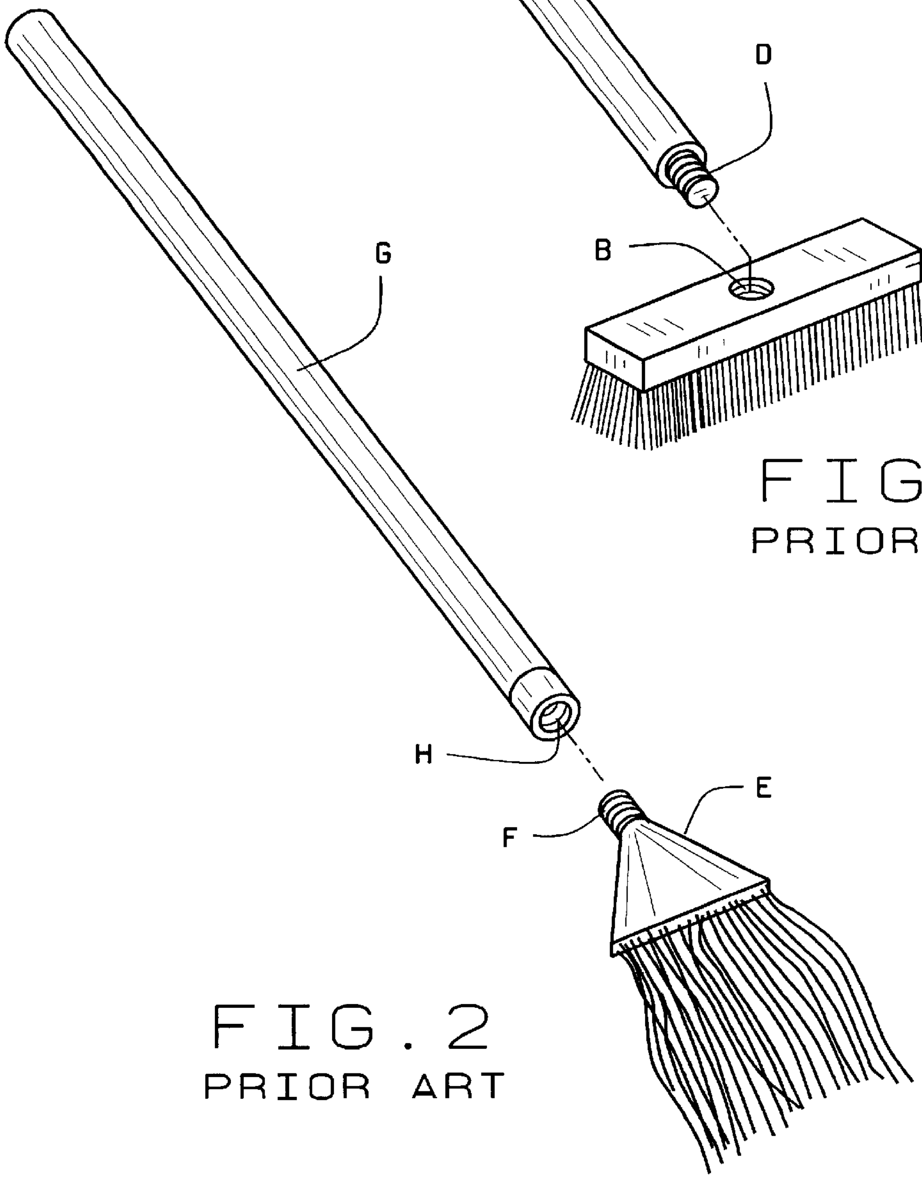
FIG. 2 PRIOR ART
FIG. 2 is an exploded view of a prior art mop head and an elongated handle designed for attachment thereto.
Figure 5:
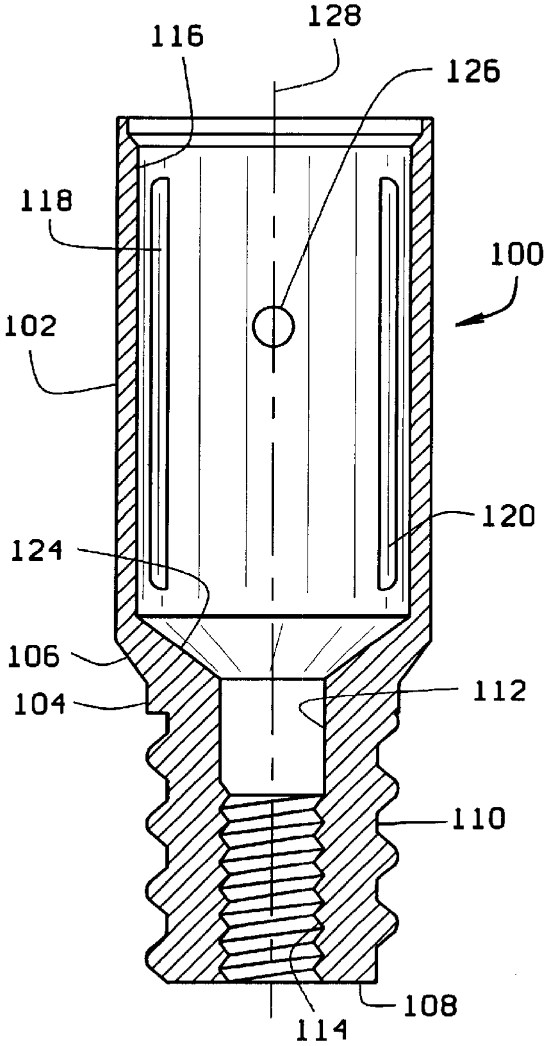
FIG. 5 is a cross-sectional view taken along line 5—5 in FIG. 3.

As shown in FIG. 5, which is a cross-sectional view taken along line 5—5 in FIG. 3, the attachment device 100 is also provided with a socket 112 that extends through the protuberance 108, and which is surrounded by the external threads 110. Preferably, at least a portion of the socket 112 is provided with internal threads 114. The socket 112 and the threads 114 are preferably dimensioned to mate with an externally threaded protuberance of a cleaning implement, such as the externally threaded protuberance F of the mop head E shown in FIG. 2.

Referring again to FIG. 5, the preferred attachment device 100 is also provided with a cylindrical socket 116 on an opposite end of the device 100 from the socket 112. The socket 116 is preferably dimensioned for receiving one end of a cylindrical elongated handle therein. Extending longitudinally (i.e., vertically, in FIG. 5) within the socket 116 are a plurality of ribs 118, 120, 122, which project radially inward into the socket 116. To facilitate manufacturing, the socket 116 is preferably connected to the socket 112 via a conical cavity 124. An aperture 126 is also provided which extends through a portion of the main wall 102, as shown in FIGS. 3 and 5.

As can be seen in FIG. 5, the socket 112, the socket 116 and the protuberance 108 each preferably share the same center axis 128, and are therefore coaxial. Although this contributes to the elegantly simple design of the device 100, and its ease of manufacture, those skilled in the art will readily appreciate that these and certain other features are not critical to implementing the present invention.

It should be noted that the protuberance 108 and the socket 112 are non-complementary with respect to one another. This means that the protuberance 108 is not dimensioned to engage the socket 116 of a like device. Likewise, the threads 110 of the protuberance 108 and the threads 114 of the socket 112 are non-complementary to one another. This means that the threads 110 of the protuberance are not dimensioned to mate with the threads 114 of the socket 112 of a like device.

Figure 1:
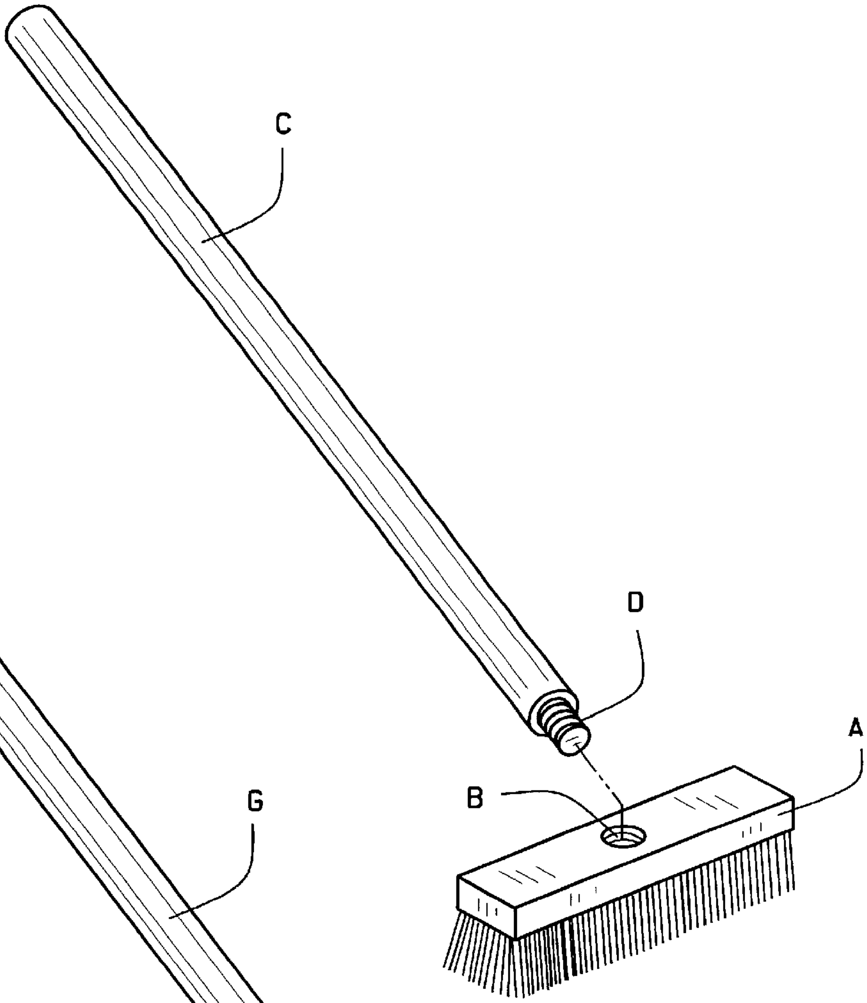
FIG. 1 PRIOR ART
FIG. 1 is an exploded view of a prior art broom head and an elongated handle designed for attachment thereto.

The attachment device 100 shown in FIGS. 3–6 can be used in both of the following manners: the externally threaded protuberance 108 can be engaged with a complementary internally threaded socket of a cleaning implement, such as the internally threaded socket B of the broom head A shown in FIG. 1; and the internally threaded socket 112 can be engaged with a complementary externally threaded protuberance of a cleaning implement, such as the externally threaded protuberance F of the mop head E shown in FIG. 2. Alternatively, where the protuberance 108 and the socket 112 of the preferred attachment device are not provided with threads, then the protuberance of the attachment device can be engaged with a complementary socket of a cleaning implement, or the socket of the attachment device can be engaged with a complementary protuberance of a cleaning implement.

An elongated (or any other type of) cylindrical handle can be attached to the preferred device 100 by inserting one end of the handle into the handle socket 116, where peripheral portions of the handle are engaged by the ribs 118, 120, 122 to achieve an interference fit and firmly secure the handle within the socket 116. A pop rivet, set screw or other suitable fastener can then be inserted through the aperture 126, if necessary or desirable, to further secure the handle within the handle socket 116. If desired, the attachment device of the present invention could also be adapted for use with non-cylindrical handles.

The preferred attachment device 100 shown in FIGS. 3–6 could certainly employ a component construction. However, in the inventor's most preferred embodiment, the device 100 is formed monolithically from either plastic or hardened steel, although other suitable materials could of course be used. To minimize wear and increase the service life of the device 100 and the cleaning implements with which it is used, the device 100 is preferably constructed from the same material as the cleaning implements. For example, where the device 100 will be used only with cleaning implements constructed from hardened steel, the device will preferably be constructed from hardened steel as well.

Figure 7:
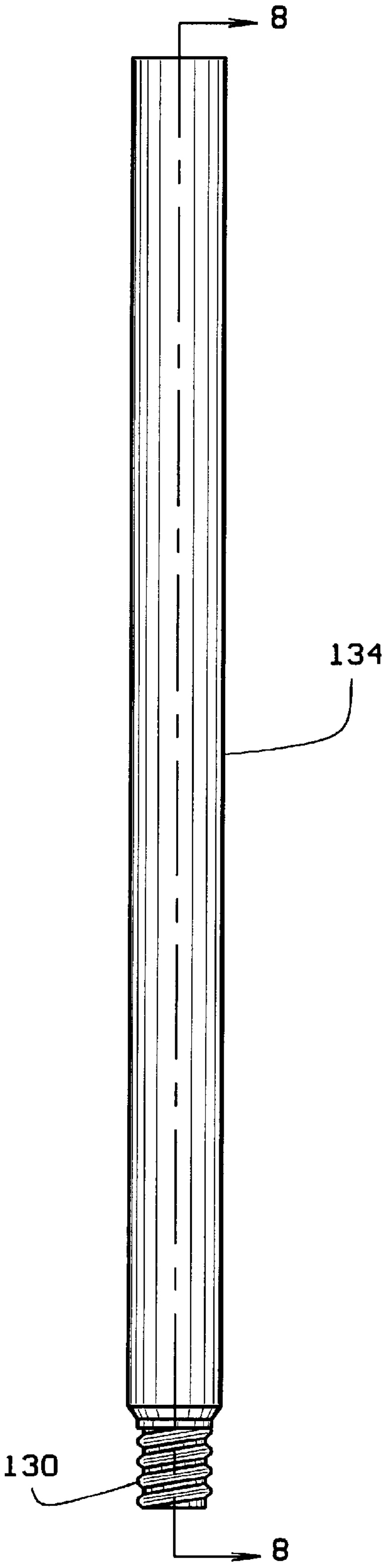
FIG. 7 is a front view of a handle attachment device according to another embodiment of the present invention.
Figure 8:
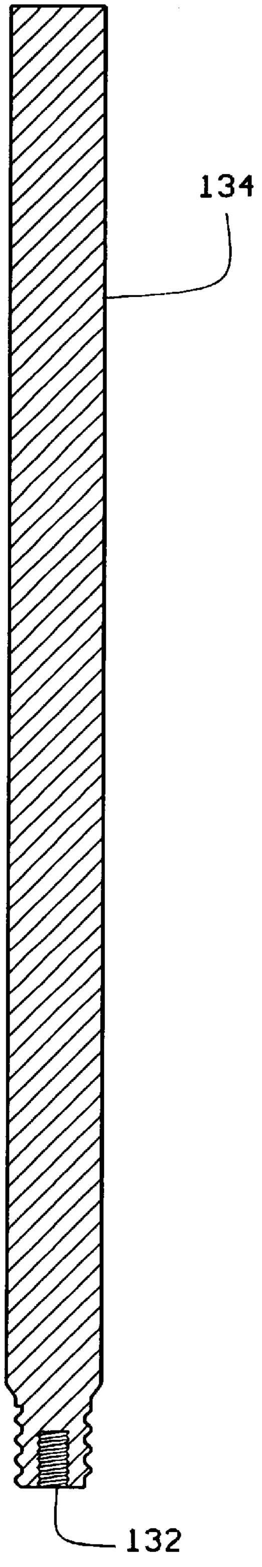
FIG. 8 is a cross-sectional view taken along line 8—8 in FIG. 7.

Although the attachment device has been described above as including a socket for attaching an elongated handle thereto, the device could instead be integrally formed with an elongated handle, as shown in FIGS. 7 and 8. Note that in this alternative embodiment, an externally threaded protuberance 130 and an internally threaded socket 132 are provided on the same end of an elongated handle 134. However, this is not strictly necessary, as the protuberance 130 and the socket 132 could instead be provided on opposite sides of the handle 134 without impairing the ability of the handle 134 to be attached to either one of a cleaning implement provided with an internally threaded socket and a cleaning implement provided with an externally threaded protuberance for purposes of attaching a handle thereto.

It will be apparent to those skilled in the art that many modifications of the above-described exemplary embodiments are possible within the spirit of the invention. Therefore, the scope of the invention should be determined by reference to the claims which follow and their full range of equivalents under applicable law.

What is claimed is:

1. A device for attaching a handle to a cleaning implement, said device including a protuberance insertable into a complementary socket of a cleaning implement, a first socket adapted for receiving a complementary protuberance of a cleaning implement, and a second socket for attaching an elongated handle to said device, the protuberance and the first socket of said device being non-complementary to one another, said device being attachable to a cleaning implement comprising either one of said complementary socket and said complementary protuberance.

2. The device of claim 1 wherein said device has a monolithic construction.

3. The device of claim 1 wherein the protuberance of said device includes external threads for mating with a complementary internally threaded socket of a cleaning implement, and the first socket of said device includes internal threads for mating with a complementary externally threaded protuberance of a cleaning implement.

4. The device of claim 3 wherein the first socket of said device is positioned within the protuberance of said device and surrounded by the threads thereof.

5. The device of claim 4 wherein the protuberance and at least the first socket of said device are coaxial.

6. A device comprising an externally threaded protuberance, an internally threaded socket, and a socket for attaching an elongated handle to said device, the handle socket having a plurality of longitudinally extending ribs positioned therein, the externally threaded protuberance and the internally threaded socket being coaxial, the internally threaded socket being positioned within the externally threaded protuberance and surrounded by threads thereof, the threads of the externally threaded protuberance and the internally threaded socket being non-complementary to one another, the externally threaded protuberance being adapted for mating with a socket having complementary internal threads, and the internally threaded socket being adapted for mating with a protuberance having complementary external threads, whereby said device can be joined with another device comprising either one of said socket having complementary internal threads and said protuberance having complementary external threads.

7. The device of claim 6 wherein said device has a monolithic construction.

8. The device of claim 7 further comprising a material selected from the group consisting of plastics and metals.

9. The device of claim 6 further comprising an elongated handle.

* * * * *